United States Patent [19] [11] Patent Number: 4,946,699
Kageyama et al. [45] Date of Patent: Aug. 7, 1990

[54] METHOD FOR PRODUCING BREAD FROM PRESERVED DOUGH

[75] Inventors: Minoru Kageyama; Mikio Kobayashi, both of Utsunomiya, Japan

[73] Assignee: Rheon Automatic Machinery Co., Ltd., Tokyo, Japan

[21] Appl. No.: 213,753

[22] Filed: Jun. 30, 1988

[30] Foreign Application Priority Data

Aug. 11, 1987 [JP] Japan .................. 62-200454

[51] Int. Cl.⁵ .................................................. A21C 1/08
[52] U.S. Cl. ...................................... 426/502; 426/19; 426/504
[58] Field of Search ................ 426/19, 502, 504

[56] References Cited

U.S. PATENT DOCUMENTS

| 3,554,137 | 1/1971 | Carre | 425/306 |
| 3,973,895 | 8/1976 | Hayashi | 426/372 |
| 4,093,749 | 6/1978 | Sternberg | 426/19 |
| 4,113,412 | 9/1978 | Hayashi | 425/335 |
| 4,192,636 | 3/1980 | Hayashi et al. | 426/502 |
| 4,276,317 | 6/1981 | Hayashi | 426/502 |
| 4,406,911 | 9/1983 | Larson et al. | 426/19 |
| 4,770,619 | 9/1988 | Rijkaart | 426/502 |

Primary Examiner—Donald E. Czaja
Assistant Examiner—Helen Pratt
Attorney, Agent, or Firm—Guy W. Shoup; Paul J. Winters; Gideon Gimlan

[57] ABSTRACT

A method is provided for producing bread of a good quality from dough preserved in a frozen state. In this method the dough is stretched while subjecting it to vibrations so that the dough can be stretched without imparting pressure exceeding the yield point of its elasticity. Thus the gluten network structure is unharmed. Then the dough is frozen for preserving. After a desired period of preservation the dough is baked. Since the dough does not become deflated, but expands further during the baking step, puffy and tasty bread results.

19 Claims, 4 Drawing Sheets

METHOD FOR PRODUCING BREAD FROM PRESERVED DOUGH

FIELD OF THE INVENTION

This invention relates to a method for producing bread from dough preserved during a desired length of time. Particularly, it relates to a method for producing bread of good quality by baking or drying dough specially prepared and quickly frozen and thereafter preserved for a long time.

PRIOR ART

Much effort has been made in the past so that freshly baked bread could be eaten at home. Making bread at home is difficult since the fermentation of dough requires controlling the time, temperature, and humidity to which the dough is subjected, and it needs special skills or knowledge. To enable consumers to eat bread fresh out of an oven, while circumventing the complicated part of the bread-making process, a method has been conceived wherein dough is frozen after a fermentation step and is preserved for an indefinite length of time for sale to consumers, who will then bake the frozen bread for eating or may preserve the bread for future use. By this method anyone can enjoy fresh bread by merely baking the frozen dough.

The problem of this type of bread has been that dough thus frozen and preserved cannot expand while it is being baked as much as the ordinary type of bread.

Japanese Patent Laid-open Publication No. 49-41556 discloses a method for freezing dough for bread, doughnuts, or the like. In this patent dough shaped into a desired form is rapidly frozen after a fermentation step. This publication describes avoiding the problem of insufficient expansion of dough by applying a chemical intumescent agent (an expansion agent) to the dough.

Japanese Patent Laid-open Publication No. 61-205437 discloses a method for producing frozen dough in which dough is frozen after a fermentation step. This publication describes avoiding the problem of insufficient expansion of dough by applying water, milk, or beaten eggs to the surface of the dough after the fermentation step so that the dough can expand sufficiently during the baking step.

The conventional automated bread production method comprises the steps of: (1) mixing the necessary ingredients and kneading them to make a dough mass, (2) measuring and dividing said dough mass into small pieces of a uniform size, (3) shaping said pieces into balls, (4) resting the dough ball for about 25 minutes, (5) degassing the dough ball, (6) shaping the ball into a desired form, (7) fermenting the shaped dough, and (8) baking the shaped dough. Therefore, at least eight steps are required for baking bread. In this method, the dough is rested or left to stand for about 25 minutes after the dividing step so that the gluten network, which was broken during the preceding dividing step, can be restored. To improve the restoration of the gluten network in the conventional process, in addition to the resting step, an oxidizing agent such as ascorbic acid and/or potassium bromate is generally mixed with the materials used for the dough. This leads to bread of a good quality. However, freezing such dough for preservation does not give good quality bread when it is baked after preservation.

Conventionally, the quality of the bread obtained by baking is considerably lower than bread made from dough which is baked immediately after the fermentation step but without preservation.

More particularly, a specific volume of at least from 4 to 4.5 cc/g is generally attained when croissant dough is baked without freezing, while a specific volume of only from 2.5 to 3 cc/g is obtained when the dough is baked after being frozen and preserved. This results in an inferior product which is harder than ordinary bread.

In the prior art dough freezing and preserving processes, if the dough is for a croissant, the dough expands greatly during a typical fermentation step, where dough is subjected to a temperature of 34° C. and a humidity of 80%, for 50 minutes, but is deflated greatly during the freezing process, and it does not recover the lost volume in the baking process. Further, when the dough is deflated after it is expanded, the surface of the dough becomes wrinkled and uneven or cracked. This is why inferior bread is produced from dough frozen and preserved according to the prior art processes.

To avoid the deflation causing wrinkles and cracks, in the prior art the dough is subjected to a fermentation time shorter than the time of the conventional condition. For instance, if the dough is for a croissant, the dough is fermented for 30 minutes instead of the conventional time period, 50 minutes. In this case, dough expands less than the dough fermented for the conventional time period. Thus, the dough is deflated less than that of the conventional fermentation period and its surface becomes less wrinkled and smoother. However, the finished bread from such dough does not expand as much as the regular bread baked from the dough of the conventional fermentation step even though it expands a little during the baking step.

After experiments and careful observation of the prior art processes, the inventors of this invention have discovered that the damage to the gluten network in dough is the cause for the deflation during the freezing step and the inferior expansion during the baking step.

SUMMARY OF THE INVENTION

An object of this invention is to provide a method for producing bread from preserved dough which expands at the same rate as bread baked from dough without preservation.

Another object of this invention is to provide a method for producing bread from preserved dough without any damage to the gluten network structure in the dough.

Still another object of this invention is to provide a method for producing bread from preserved dough in which dough expands more than the bread made from dough frozen and preserved by conventional methods.

Still another object of this invention is to provide a method for producing bread from preserved dough in which the finished bread has a good quality, without applying an oxidizing agent.

Still another object of this invention is to provide a method for producing bread from preserved dough, where dough for preservation can be obtained without requiring the step of resting after the dividing step.

In this invention a method for producing bread from preserved dough is provided comprising the steps of:
(a) mixing and kneading various materials such as yeast, water, sugar, flour, or the like, required for producing a desired type of bread, to make dough,
(b) stretching said dough while subjecting it to vibrations, (c) cutting and shaping said dough into a desired form,
(d) fermenting said dough,
(e) freezing said dough,
(f) preserving said frozen dough for any desired length of time, and
(g) baking or frying said dough.

In the steps of the method of this invention no resting step is required after the dividing step. Because no divider apparatus to divide the dough mass into dough portions is used, in which apparatus a high pressure is inevitably imparted to the dough, this method does not damage the gluten network structure of dough during the dividing step. Since dough is first stretched by imparting to it a tension while maintaining the dough's elasticity, and then cut into a desired shape, no high pressure damaging the gluten is imparted to the dough during the stretching and dividing step. In the stretching step, pressure is applied to dough in the form of vibrations. When dough is subjected to vibrations a thixotropy effect appears in the dough and thus it is readily stretched by imparting to it a tension lower than the yield point of the dough elasticity. Also, since the dough is cut after it is stretched, the area being affected by cutting is effectively minimized as compared to the prior art in which dough balls are forcibly divided from the dough mass. Thus neither the step of resting nor the step for applying an oxidizing agent to the dough to accelerate its expansion is required after dividing the dough material.

In this invention dough is stretched by applying pressure which is within a range where the elasticity of the dough is not lost, to avoid damage to the gluten network structure.

EMBODIMENTS

Figure 1:
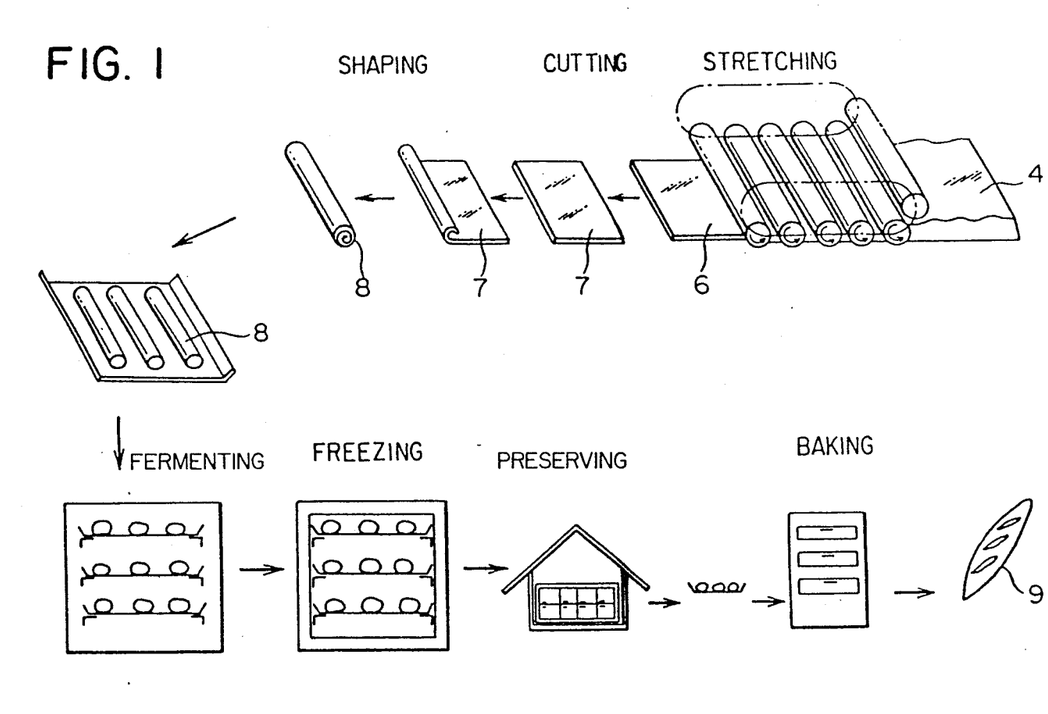
FIG. 1 generally shows the sequence of steps for producing French bread according to the method of this invention.
Figure 3:
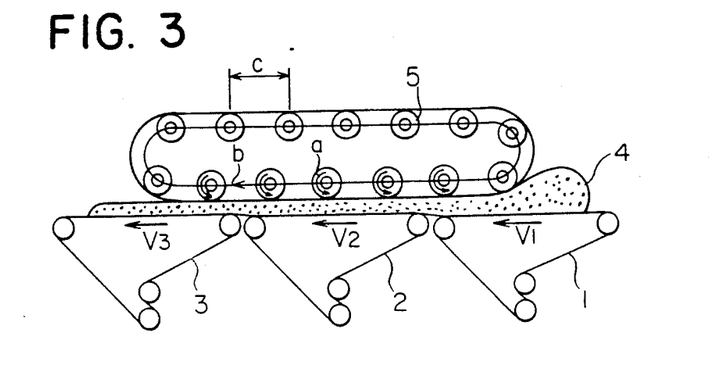
FIG. 3 shows the roller mechanism and the conveyor arrangement which is used to stretch dough in the process of this invention.
Figure 4:
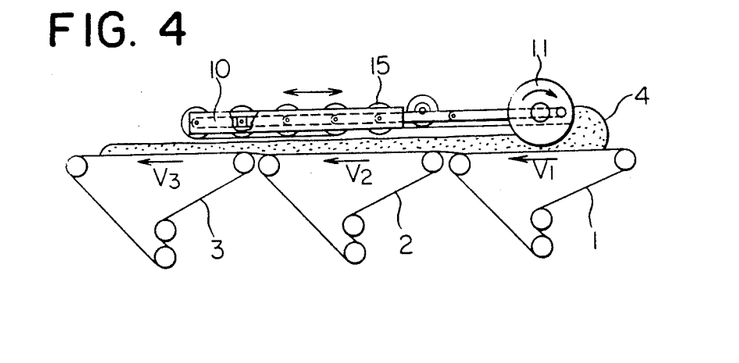
FIG. 4 shows another embodiment of the roller mechanism and the conveyor arrangement which is used to stretch dough in the process of this invention.

In the beginning of the process, in FIG. 1, dough mass (4) is produced by mixing and kneading various materials such as yeast, water, butter, sugar, flour, or the like, which are required for producing French bread. Then the dough mass (4) is stretched, as shown in FIGS. 1, 3, and 4, while it is subjected to vibrations.

Figure 2:
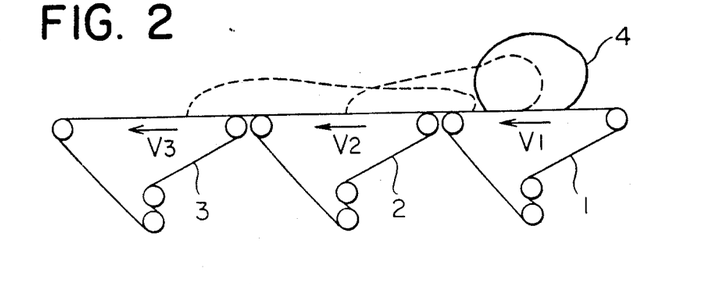
FIG. 2 shows the conveyor arrangement which is used to stretch dough in the process of this invention.

In FIG. 2 dough is stretched by placing the dough mass (4) on the conveying path formed by three conveyors (1) (2) (3). These conveyors are arranged serially and driven at different speeds. The relation among the speed ($V_1$) of the first conveyor (1), the speed ($V_2$) of the second conveyor (2), and the speed ($V_3$) of the third conveyor (3) is:

$$V_1 < V_2 < V_3$$

When the dough mass (4) is placed on the conveying path so as to extend over two or three of the conveyors (1, 2, 3), tension is continuously imparted to the dough mass (4).

In FIG. 3 a roller mechanism having a plurality of rollers (5) freely rotatable about their axes in the direction designated by the arrow a and movable along an endless roller path in the direction designated by the arrow b is arranged above the conveying path of the conveyors (1, 2, 3) shown in FIG. 2. The roller mechanism may be mounted to a base in any conventional way. The rollers (5) are mounted by means of bearings around their shafts so as to be freely rotatable. The movement of the rollers in the direction b is faster than the movement of any of the conveyors. The rollers (5) are arranged in a way in which the distance c between any adjacent pair of the rollers (5) is short enough so that uniform vibrations are always provided throughout the area of dough between the conveyors (1, 2, 3) and the roller mechanism. Such a roller mechanism is disclosed in U.S. Pat. No. 3,973,895, which is incorporated herein as a reference.

By arranging the rollers (5) above the conveyors (1, 2, 3), the dough mass (4) is pressed by the moving rollers against the conveying path, and is effectively stretched by the conveyors, while rotating and moving the rollers (5) in the directions of the arrows a and b. Thus the dough mass (4) is continuously subjected to vibrations and tension.

When one of the rollers (5) presses a certain area of the dough mass (4) against the conveying path of the conveyors (1, 2, 3) the area of the dough is stretched by a tensile pressure caused by the difference in the speeds of the conveyors (1, 2, 3) and temporarily becomes thinner. The area of the dough mass (4) is then released from the rollers (5) when the roller (5) moves away from the area, and the area of dough partially recoveres its thickness due to its elasticity. Such a process is repeated and the pressure in the dough is imparted and removed repeatedly, which causes vibrations in the dough. As a result fluidity appears in the dough because of the vibrations. Such a phenomenon is called a thixotropy effect, and the area of the dough mass is stretched and permanently becomes thinner without pressure higher than the yield point of the elasticity of the dough having been imparted. Thus no high pressure that might damage the gluten network structure of the dough is provided to the dough in this invention.

FIG. 4 shows another roller mechanism to stretch the dough without subjecting it to pressure greater than the yield point of its elasticity. This roller mechanism includes a plurality of rollers (15) freely rotatable about their axes along a straight path. These rollers (15) are connected by a pair of connecting arms (10) at both their ends. At the upstream end of each of both arms (10) a disc (11) is provided to move the rollers (15) back and forth along the straight path. Such a roller mechanism is disclosed in U.S. Pat. No. 4,692,110, which is incorporated herein as a reference.

Figure 7:
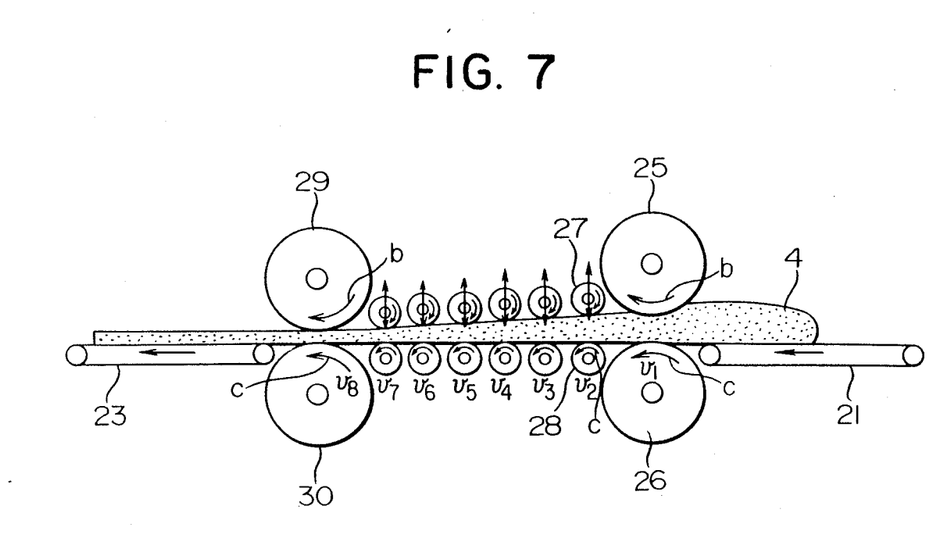
FIG. 7 shows still another embodiment of the roller mechanism and the conveyor arrangement which is used to stretch dough in the process of this invention.

FIG. 7 shows still another roller mechanism to stretch the dough without subjecting it to pressure greater than the yield point of its elasticity. This mechanism is mounted to a base in any conventional way and includes a supply conveyor (21), a pair of supply rollers (25, 26), a pair of discharge rollers (19, 30), a plurality of upper rollers (27), and a plurality of lower rollers (28). The plurality of upper and lower rollers (27, 28) are disposed between the pair of supply rollers (25, 26) and the pair of discharge rollers (29, 30).

The plurality of upper rollers (27) are connected by a pair of connecting arms (not shown) at both their ends and are freely rotatable about their axes. The upper rollers are raised or lowered, as indicated by the vertical arrows in FIG. 7, by a pair of air cylinder mechanisms which are mounted on the base and connected to the respective ends of the arms. The lower rollers (28) are vertically juxtaposed with the respective upper rollers (27). The lower supply roller (26), the plurality of lower rollers (28), and the lower discharge roller (30), are driven in the direction c.

If the speeds of the lower supply conveyor (26), the first to sixth rollers of the plural lower rollers (28), and the lower discharge roller (30), are represented by $V_1$, $V_2$, $V_3$, $V_4$, $V_5$, $V_6$, $V_7$, and $V_8$, respectively, as shown in FIG. 7, the relation among the speeds of these rollers is:

$$V_1 < V_2 < V_3 < V_4 < V_5 < V_6 < V_7 < V_8$$

The pair of supply rollers are vertically juxtaposed. As shown in FIG. 7, the upper roller (25) is driven in the direction b so that the pair of supply rollers (25, 26) moves in the same direction at the area where they face each other and at the same speed $V_1$. Similarly, the pair of discharge rollers (29, 30) are vertically juxtaposed and driven so that they move in the same direction at the area where they face each other and at the same speed $V_8$. The belt of the supply conveyor (2) is driven at the same speed as the peripheral rotation speed of the pair of supply rollers (25, 26). Similarly the belt of the discharge conveyor (23) is driven at the same speed as the peripheral rotation speed by the pair of discharge rollers (29, 30). The pair of supply rollers (25, 26), the plurality of upper and lower rollers (27, 28), and the pair of discharge rollers (29, 30), are so arranged that a gap formed between the straight line defined by the lowermost parts of the upper rollers (25, 27, 29) and the straight line defined by the uppermost parts of the lower rollers (26, 28, 30) becomes progressively narrow in the downstream direction.

In operation, the plurality of upper rollers (27) are repeatedly raised and lowered to impart to the dough uniform vibrations throughout the area between the plurality of upper rollers (27) and the plurality of lower rollers (28). As we explained above, the dough is stretched because of the thixotropy effect caused by the vibrations and the speed differences among the lower rollers (26, 28, 30).

When dough is stretched by the above-mentioned processes, pressure of only about 70 g/cm² or less, which is very low compared with the other stretching processes, is applied to the dough. Thus, neither the elasticity in the dough stretched is lost nor is the network structure of the gluten damaged.

In FIG. 1 the dough stretched is then cut and shaped into a desired form. The stretched dough sheet (6) is cut into pieces (7) having any desired dimensions and then rolled into roll bars (8).

Figure 5:
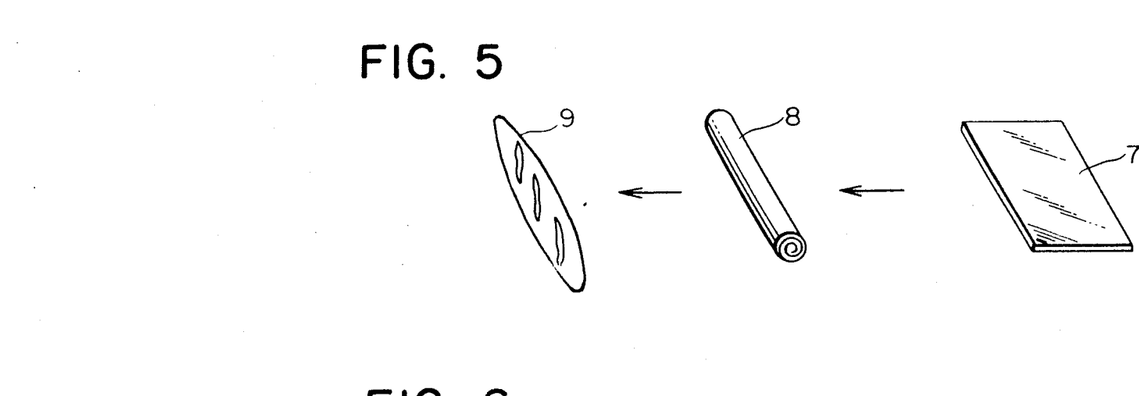
FIG. 5 shows the sequence of steps to shape a dough piece into the form of French bread.

In FIG. 5 the steps for shaping a dough piece (7) into the form of French bread are shown. A rectangular dough piece (7) is rolled into a roll bar (8) and shaped into a long spindle form. Then some incisions are provided, resulting in dough in the form of French bread (9).

Figure 6:
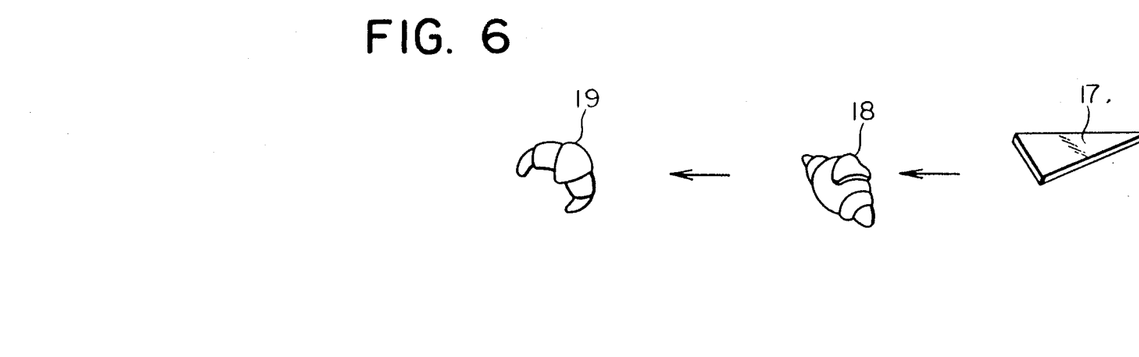
FIG. 6 shows the sequence of steps to shape a dough piece into the form of a croissant.

Naturally any type of bread can be produced from the dough sheet (6). FIG. 6 shows the steps for shaping a dough piece into the dough of a croissant form. In this embodiment, before the dough is shaped into a form of croissant, a fat layer such as butter or shortening is applied on the surface of the dough sheet (6). The dough sheet (6) is then folded to sandwich the fat layer, thereby producing pastry dough having many fat layers. Then such a dough sheet (6) is stretched and cut into triangular dough pieces (17). The dough piece (17) is rolled up into a spindle shape (8) and then shaped into an arched form (9).

As shown in FIG. 1, the next step is a fermentation step. The dough for a croissant shaped into a desired form (8) is subjected to a temperature of 34° C. and a humidity of 80% for 50 minutes. These are conventional conditions for fermentation of croissant dough. As stated above, since the network structure of gluten in the dough is not damaged during the stretching or cutting step the step to rest the dough is not necessary after the stretching or cutting dough. Thus bread of good quality can be produced without resting the dough after stretching or dividing dough, or applying an oxidizing agent to the dough.

The dough (8) is then put in a freezing room and subjected to a temperature of about −40° C, to freeze it rapidly.

Then the frozen dough is preserved in a freezing room or freezer for a desired length of time. The dough thus preserved can be sold to consumers, who can continue preserving the dough in their own freezers.

The dough is taken out of the freezing room or freezer and baked. The shaped dough can be placed in a preheated oven at from about 185° C. to about 200° C. immediately after it has been removed from the freezer. Such dough will bake in about 13-20 minutes. No proofing or additional fermentation time is necessary as has been the case with prior art doughs. The finished croissant produced from the frozen dough fermented under the conventional conditions attains a specific volume of 4.5-5.5 cc/g and has a satisfying quality. The dough of this invention is deflated less than that of the prior art method during the freezing step. It expands sufficiently during the baking step and becomes puffy and tasty bread. Such bread has almost the same good quality as that produced from dough without preservation.

To further improve the quality of the finished bread, the dough of this invention is fermented under special conditions in which the temperature is lower and the time period is longer than for the conventional method. Where the dough is for a croissant, the dough is subjected to a temperature of about 30° C., and humidity of about 80%, for about 70 minutes. When dough is fermented under these special conditions, the dough expands more than dough fermented under the conventional conditions. Such extra expansion can compensate for the slight deflation of the dough during the freezing step. Thus, finished bread of an improved quality can be produced. The finished croissant produced from the dough of this invention and fermented under these special conditions attains a specific volume of 5.5-6 cc/g.

The following example shows the ingredients of a typical croissant dough and the preferred method of its preparation and baking.

|   | Ingredients | Weight % Flour Basis |
|---|---|---|
| 1 | Enriched wheat flour (including 14% wheat protein) | 100.00 |
| 2 | Yeast | 8.00 |
| 3 | Salt | 1.80 |
| 4 | Sugar | 10.00 |
| 5 | Shortening | 5.00 |
| 6 | Gluten (vital gluten) | 2.00 |
| 7 | Dough conditioner Surfactant ... monoglyceride Vitamin C Glucose | 1.50 |
| 8 | Homogenized dry milk | 3.00 |
| 9 | ARAKADY (trademark, expansion agent) Ingredients: $CaSO_4$ 24.00 (%) $NH_4Cl$ 9.38 (%) $KBrO_3$ 0.27 (%) NaCl 25.00 (%) Starch 40.45 (%) | 1.50 |
| 10 | Water | 60.00 |
| 11 | L-cystine | 30 ppm |

| | Process for producing croissant dough | |
|---|---|---|
| 1. | Mixing and kneading | 10–15 min. temperature of the dough: 15° C. |
| 2. | Letting the kneaded stand | 42–58 min. temperature: 59° F. |
| 3. | Stretching the bulk into a dough sheet | |
| 4. | Applying fat to the surface of the stretched dough to form a fat layer and folding said dough to sandwich the fat layers between the folded dough layers, thereby producing a pastry dough sheet | |
| 5. | dividing the pastry dough sheet into pieces | |
| 6. | Shaping the pieces into a desired form | |
| 7. | Fermenting the shaped dough pieces | 70 min. temperature: 32° C. The dough after fermenting attains a specific volume of about 3 cc/g. |
| 8. | Freezing | The dough is placed in a freezer, and kept at −30° C. for 50 min. (Temperature of the dough at its center reaches −10° C. to −12° C. after 50 min.) |
| 9. | Packing | The dough after freezing has a specific volume of 2.7 cc/g. |
| 10. | Preserving | Preserving period: 7 to 180 days temperature: −18° C. |
| 11. | Baking | 17 min. temperature: 185–200° C. (preheated) The dough after baking attains a specific volume of about 5.5 cc/g. |

Although we explained the special conditions for croissant dough, dough for each type of bread may have its own special conditions for sufficient expansion. For example, where the dough is for French dough, the dough is preferably subjected to a temperature of about 32° C., and a humidity of about 80%, for about 90 minutes. (The conventional conditions: 34° C., 80% for 70 min.)

As discussed above, since the gluten network structure in the dough of this invention is not broken after the stretching process, the dough of this invention is deflated less than that of the prior art during the freezing step, as is readily understood from Table 1.

TABLE 1

| Specific volumes of Croissant Dough | | | |
|---|---|---|---|
| | After the fermentation step | After the freezing step | After the baking step |
| 1 The dough of the prior art method | 2.8 cc/g | 2.3 cc/g | 2.5–3 cc/g |
| 2 the dough of this invention fermented under conventional conditions | 2.8 cc/g | 2.5–2.7 cc/g | 4.5–5.5 cc/g |
| 3 the dough of this invention fermented under the special conditions | 3 cc/g | 2.7 cc/g | 5.5–6 cc/g |

Thus the surface of the frozen dough does not become cracked or uneven, and remains smooth. During the baking step, the dough of this invention expands far more than that of the prior art, as is shown in Table 1. Thus, bread as good as that produced from dough without preservation can be obtained. Since the method of this invention does not need a step for resting after the dividing step, the time required for producing the frozen dough can be reduced. Since "resting" normally is done about 30 minutes in the prior art processes, this length of time can be the reduction in production time, since even in prior art processes some form of stretching dough is required before shaping dough pieces into a desired form and the time required for this step is more or less the same as the time for stretching in this invention. The inventors have discovered that the finished bread produced from the dough of this invention and that was preserved for one year maintained its quality. However, the inventors also expect that bread produced by dough produced by the method of this invention that is preserved for more than one year will also maintain its quality.

Further, for regular bread, the finished bread produced from the dough of this invention fermented under the special conditions attains a larger specific volume than that of dough fermented under the conventional conditions. Thus, the increased expansion caused by the fermentation under the special conditions can compensate for the slight deflation of the dough of this invention during the freezing step. As a result, finished bread of an improved quality can be obtained.

Therefore, fresh bread of good quality can be easily baked at any time by merely baking the dough preserved in the frozen state.

We claim:

1. A method for producing bread from preserved dough comprising the steps of:
   (a) mixing and kneading materials required for producing a desired type of bread, to make a dough body having a gluten network,
   (b) stretching said dough body into an elongated first form while subjecting said dough body to vibrations such that a thixotropy effect appears in the dough body and said gluten network is not damaged during the stretching step,
   (c) cutting said first form of said dough body into two or more dough parts each having a desired second form,
   (d) fermenting said dough parts,
   (e) freezing said fermented dough parts,
   (f) preserving said frozen dough parts, and
   (g) baking or frying said preserved dough parts.

2. The method of claim 1, further comprising a step of applying fat to the surface of the stretched dough body to form a fat layer on a dough layer and folding said dough body to sandwich the fat layer between portions of the folded dough body, thereby producing pastry dough.

3. The method of claim 1, wherein said stretching includes pulling said dough body while subjecting said dough body to vibrations, so that a pressure of no more than about 70 g/cm$^2$ is imparted to said dough body.

4. The method of claim 1, wherein said fermenting step comprises a step of subjecting said dough parts to a predetermined temperature and humidity for a predetermined time period.

5. The method of claim 4, wherein said temperature is about 30° C., said humidity is about 80% and said time period is about 70 minutes where said bread is a croissant.

6. The method of claim 4, wherein said temperature is about 32°, said humidity is about 80%, and said time period is about 90 minutes where said bread is French bread.

7. The method of claim 1, wherein said stretching step comprises placing said dough body on a conveying path having a plurality of conveyors arranged in series and driven at different speeds so that each of the conveyers is faster than that of an upstream conveyor while said dough is held on the conveying path and providing a roller mechanism having a plurality of rollers positioned above said conveying path to stretch said dough body.

8. The method of claim 7, wherein said fermenting step comprises a step of subjecting said dough parts to a predetermined temperature and humidity for a predetermined period of time.

9. The method of claim 8, wherein said temperature is about 30° C., said humidity is about 80% and said time period is about 70 minutes where said bread is a croissant.

10. The method of claim 8, wherein said temperature is about 32° C., said humidity is about 80% and said time period is about 90 minutes where said bread is French bread.

11. The method of claim 7, wherein said plurality of rollers are freely rotatable about their axes and movable along an endless roller path, the peripheries of the moving rollers forming a closed envelope.

12. The method of claim 7, wherein said plurality of rollers are freely rotatable on a straight roller path and movable back and forth in unison on said straight path.

13. The method of claim 1, wherein said stretching step comprises the step of placing said dough body on a conveying path having a first plurality of rollers arranged in series and driven at different speeds so that the peripheral speed of each one of the rollers is faster than that of an upstream roller while said dough is held on the conveying path and positioning a second plurality of rollers above said first plurality of rollers so that a gap is formed between the first plurality of rollers and the second plurality of rollers and the gap becomes progressively narrower in the downstream direction, where said second plurality of rollers are positioned to be repeatably raised and lowered above said first plurality of rollers.

14. A method of producing frozen dough comprising:
 (a) forming a dough body having elasticity with a yield point;
 (b) stretching said dough body while subjecting said dough body to vibrational forces such that a thixotropy effect appears in said dough body and said yield point of said elasticity is not exceeded;
 (c) fermenting said stretched dough body; and
 (d) freezing said stretched dough body.

15. The method of claim 14 wherein said dough body has a gluten network, and wherein said stretching step further comprises:
 (a) exerting a tensile force in a longitudinal direction such that said dough body is stretched in the longitudinal direction but the yield point of said elasticity is not exceeded and said gluten network is not damaged; and
 (b) exerting repeated compressive forces at an angle to said longitudinal direction such that said yield point of said elasticity is not exceeded and said gluten network is not damaged.

16. The method of claim 1 wherein said materials include one or more items selected from the group consisting of yeast, water, sugar and flour.

17. The method of claim 2, wherein said stretching includes pulling said dough body while subjecting said dough body to vibrations, so that a pressure of no more than about 70 g/cm$^2$ is imparted to said dough body.

18. The method of claim 2, wherein said fermenting step comprises a step of subjecting said dough parts to a predetermined temperature and humidity for a predetermined time period.

19. The method of claim 3, wherein said fermenting step comprises a step of subjecting said dough parts to a predetermined temperature and humidity for a predetermined time period.

* * * * *

UNITED STATES PATENT AND TRADEMARK OFFICE
CERTIFICATE OF CORRECTION

PATENT NO. : 4,946,699

DATED : August 7, 1990

INVENTOR(S) : Minoru Kageyama and Mikio Kobayashi

It is certified that error appears in the above-identified patent and that said Letters Patent is hereby corrected as shown below:

On the title page:

Assignee should read:

Rheon Automatic Machinery Co., Ltd.
    Utsunomiya, Japan Col. 4 Line 42

"recoveres" should read --recovers--

Signed and Sealed this

Third Day of December, 1991

Attest:

HARRY F. MANBECK, JR.

*Attesting Officer*      *Commissioner of Patents and Trademarks*